(12) United States Patent
Lanzi

(10) Patent No.: US 9,624,038 B2
(45) Date of Patent: Apr. 18, 2017

(54) DEVICE AND METHOD FOR DEPALLETIZATION

(71) Applicant: GEBO PACKAGING SOLUTIONS ITALY S.R.L., Parma (PR) (IT)

(72) Inventor: Mauro Lanzi, Parma (IT)

(73) Assignee: GEBO PACKAGING SOLUTIONS ITALY S.R.L., Parma (PR) (IT)

( * ) Notice: Subject to any disclaimer, the term of this patent is extended or adjusted under 35 U.S.C. 154(b) by 0 days.

(21) Appl. No.: 14/827,890

(22) Filed: Aug. 17, 2015

(65) Prior Publication Data

US 2016/0083193 A1 Mar. 24, 2016

(30) Foreign Application Priority Data

Sep. 18, 2014 (IT) .............. TO2014A0740

(51) Int. Cl.
| | |
|---|---|
| *B65G 47/68* | (2006.01) |
| *B65G 37/00* | (2006.01) |
| *B65G 47/244* | (2006.01) |
| *B65G 59/02* | (2006.01) |
| *B65G 61/00* | (2006.01) |
| *B65G 47/52* | (2006.01) |

(52) U.S. Cl.
CPC ......... *B65G 37/00* (2013.01); *B65G 47/2445* (2013.01); *B65G 47/52* (2013.01); *B65G 47/68* (2013.01); *B65G 59/02* (2013.01); *B65G 61/00* (2013.01)

(58) Field of Classification Search
CPC ...... B65G 37/00; B65G 37/005; B65G 37/02; B65G 47/06; B65G 47/08; B65G 47/52; B65G 47/2445; B65G 47/46; B65G 47/68; B65G 47/71
See application file for complete search history.

(56) References Cited

U.S. PATENT DOCUMENTS

| | | | | |
|---|---|---|---|---|
| 2,716,497 A | * | 8/1955 | Wahl ............. | B65G 57/04 198/374 |
| 3,836,018 A | * | 9/1974 | Dawson ........ | B65G 57/04 414/790.4 |
| 5,971,700 A | * | 10/1999 | Heston ......... | B65G 57/06 414/751.1 |

* cited by examiner

*Primary Examiner* — Mark Beauchaine
(74) *Attorney, Agent, or Firm* — Young & Thompson

(57) ABSTRACT

A depalletization device (1) that is able to disassemble a pallet (2) that is made up of at least a number of layers (3), includes: a loading/unloading device (6), which is able to separate and extract a layer (3) from the pallet (2); a first conveyor (7) that can be supplied with the layer (3) that is separated from the pallet (2) and is able to move the layer (3) forward; the depalletization device (1) also includes: a second conveyor (10), which can be fed from the first conveyor (7) with an entire layer (3); a pair of third conveyors (11a, 11b) that are able to receive, one or the other alternatingly, the entire layer (3); and actuator elements (14) that can be controlled to transfer the entire layer (3) from the second conveyor (10) to either of the third conveyors (11a, 11b).

17 Claims, 4 Drawing Sheets

DEVICE AND METHOD FOR DEPALLETIZATION

FIELD OF THE INVENTION

This invention pertains to a device and a method for depalletization in order to disassemble a pallet that is composed of a number of layers stacked one on top of the other.

More specifically, each layer of the pallet is made up of a number of boxes of containers, for example, bottles containing food products arranged next to one another.

BACKGROUND OF THE INVENTION

In order to make it possible to retrieve the bottles, depalletization devices are able to break down the pallet into individual layers and to disassemble the individual layers into the respective boxes.

Depalletization devices are known that essentially comprise the following:

- A first and a second entry conveyor, which feed the pallet to be disassembled to an extraction station;
- An extraction/unloading station that extracts the upper layer from the pallet arranged corresponding to the extraction station of the entry conveyor;
- A first intermediate conveyor onto which the extraction/unloading head places the above-mentioned upper layer extracted from the pallet; and
- A second intermediate conveyor that is located adjacent to and behind the first conveyor and that receives the layer from the first conveyor and advances it by means of a pusher.

More specifically, the second intermediate conveyor transfers the layers that are extracted from the pallet one after the other along a first axis.

The depalletization devices of the known type also include:

- A first and a second exit conveyor that are parallel to one another and that respectively transfer a first group of boxes from the layer and a second group of boxes from the same layer parallel to the first axis; and
- A dividing station that receives the layer from the first intermediate conveyor, divides it into a first group and a second group, and transfers the first group and the second group respectively to the first exit conveyor and the second exit conveyor.

More specifically, the dividing station transfers the first group of boxes into a first line and along a second axis that is orthogonal to the first axis, in such a way as to transfer the first group of boxes onto the first exit conveyor.

Similarly, the dividing station moves the second group of boxes ahead into a second line that runs opposite to the first line and along the second axis, in such a way as to transfer the second group of boxes onto the second exit conveyor.

More specifically, the dividing station comprises a number of first and second driven rollers that are able to rotate around the respective third axes that are parallel to the first axis.

The first rollers are located on the side of the first exit conveyor and rotate in the first line so as to transfer the first group of boxes onto the first exit conveyor.

By contrast, the second rollers are located on the side of the second exit conveyor and rotate in the second line so as to transfer the second group of boxes onto the second exit conveyor.

The first (second) exit conveyor also respectively receives the boxes of the first (second) group with their respective arrangements, which are determined from how the above-mentioned boxes were assembled in the corresponding layer of the pallet.

These arrangements are generally not the arrangement that is desired at the exit from the depalletization station.

In order to arrange the boxes at the exit from the depalletization device in the desired way, for example, with the short sides orthogonal to the first axis, the depalletization device of the known type comprises a number of fixed obstacles that are located in a position that is above the exit conveyors and against which the boxes from the first group and second group bump while being transferred from the respective exit conveyors.

The bumping against the fixed obstacles determines the rotation of the boxes but does not put the boxes into the desired arrangement.

The depalletization devices of the type described above turn out to be especially complex to build and maintain and especially bulky, particularly owing to the fact that it is necessary to provide a large number of conveyors, each of which is of non-negligible size.

It has therefore become a requirement in this field to make the depalletization device more compact and at the same time to simplify the process of building and maintaining the depalletization device itself.

The depalletization devices of the known type as described above also have considerable room for improvement with regard to the precision and repeatability with which the boxes are oriented according to the pre-established design.

In particular, it is possible to identify in the layer of the pallet a number of rows of boxes that are parallel to the first axis and thus to the third axes of the first and second rollers of the dividing station.

These rows are separated inside the dividing station by means of the first and second rollers.

If boxes from different rows rest on the same first or second rollers, the dividing station of the depalletization devices of the known type request additional auxiliary devices to complete the separation of the above-mentioned rows.

In other words, the depalletization devices of the known type are optimized for a limited number of formats of the layers, that is, for a limited number of geometric arrangements of the rows of the layers, and thus these devices have little flexibility.

It has also been found in the industry that there is a requirement to make depalletization devices that are especially flexible, in particular with regard to the ability to break down layers into rows of boxes in any format.

SUMMARY OF THE INVENTION

The purpose of this invention is to provide a depalletization device that is able to break down a pallet that is composed of at least a number of layers; this will make it possible to meet at least one of the above-mentioned requirements in a simple and economical manner.

The above-mentioned purpose is achieved by this invention by virtue of the fact that it pertains to a depalletization device that is able to break down a pallet that is composed of at least a number of layers, as defined in in claim 1.

This invention also pertains to a depalletization method for breaking down a pallet that is composed of a number of layers as defined in claim 11.

BRIEF DESCRIPTION OF THE DRAWINGS

In order to provide a better understanding of this invention, below a preferred embodiment is described, which is purely by way of a non-limiting example and which refers to the attached figures, where.

DETAILED DESCRIPTION OF THE INVENTION

Figure 1:
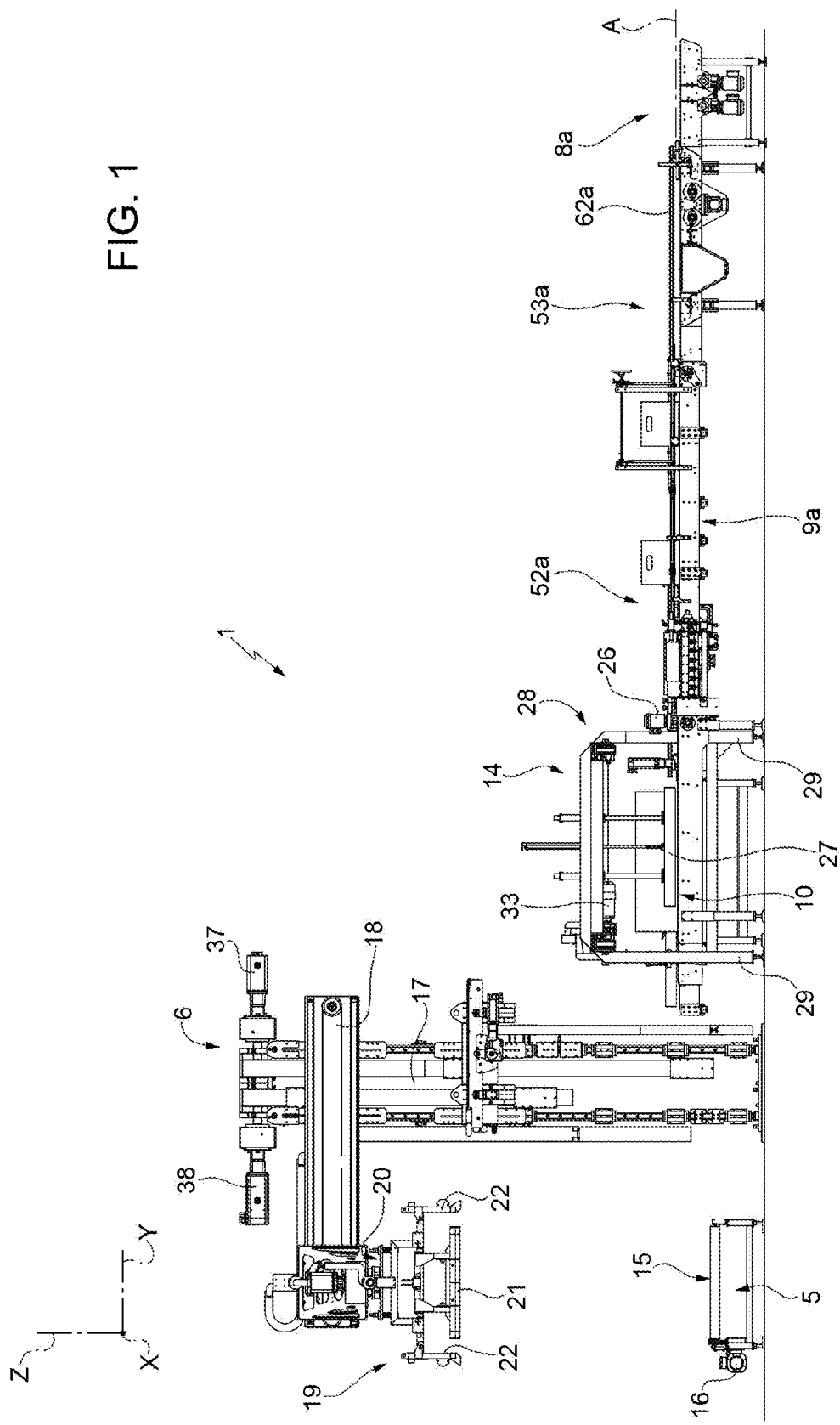
FIG. 1 is a front view of a depalletization device that is implemented in accordance with this invention, with the parts exploded for the sake of clarity.

With respect to the attached figures, 1 indicates a depalletization device that is able to disassemble a pallet 2 made up of a number of layers 3 that are arranged one on top of the other.

More specifically, each layer 3 is made up of a number of boxes 4 of containers (not shown), for example food-product bottles that are empty and have previously been used.

The device 1 is also able to break down each layer 3 into the respective boxes 4, i.e., to make it possible to retrieve the bottles contained therein.

Figure 3:
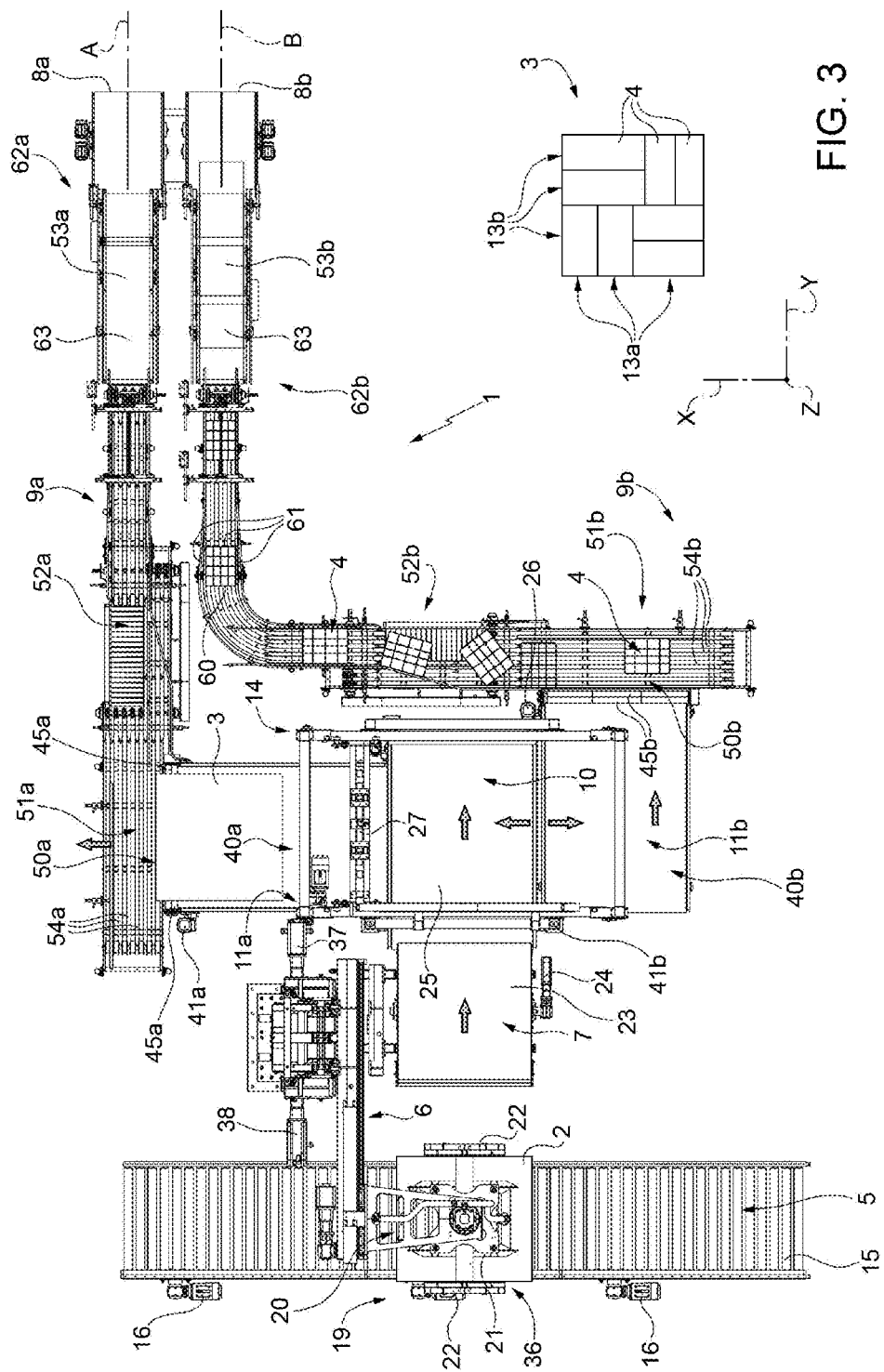
FIG. 3 is a top view of the depalletization device of FIGS. 1 and 2.

Each layer 3 consists essentially of (FIG. 3):
A number of rows 13a that are arranged in a line parallel to an axis Y, which is horizontal in the case illustrated here and where the rows are adjacent to one another parallel to an axis X that is transverse to the axis Y and is horizontal in the case illustrated here; and
A number of columns 13b that are arranged in a row parallel to the axis X and adjacent to one another parallel to the axis Y.

Each box 4 is delimited by:
A pair of sides 60 that are parallel to one another; and
A pair of sides 61 that are parallel to one another and arranged between sides 60.

In particular, the sides 60 are shorter than the sides 61.

The device 1 essentially comprises:
An entry conveyor 5, which is able to transfer the pallet 2 in parallel to the axis X, which is horizontal in the case illustrated here;
A loading/unloading device 6 that is able to extract one layer 3 after the other from the conveyor 5 corresponding to an extraction station 36 of the conveyor 5 itself;
A conveyor 7 on which the device 6 places the layers 3 one after the other; and
A pair of exit conveyors 9a, 9b that are able to convey the boxes 4 from the layer 3 towards a respective exit station 8a, 8b of the device 1.

In particular, the conveyor 5 comprises a transfer surface 15, which is horizontal in the case illustrated here, and one or more motors 16 that are driven in order to cyclically determine the forward progress of the surface 15 parallel to the axis X and/or to halt the surface 15 corresponding to station 36.

The device 1 also comprises a control device 12 (indicated only in schematic form in FIG. 4) that is programmed to control the motor 16 in such a way as to:
Cause the surface 15 and the pallet 2 to move forward parallel to the axis X; and
Halt the surface 15 and the pallet 2 corresponding to station 36.

In the case illustrated here, the surface 15 is defined by a number of rollers that have respective axes, which extend parallel to the axis Y.

Figure 2:
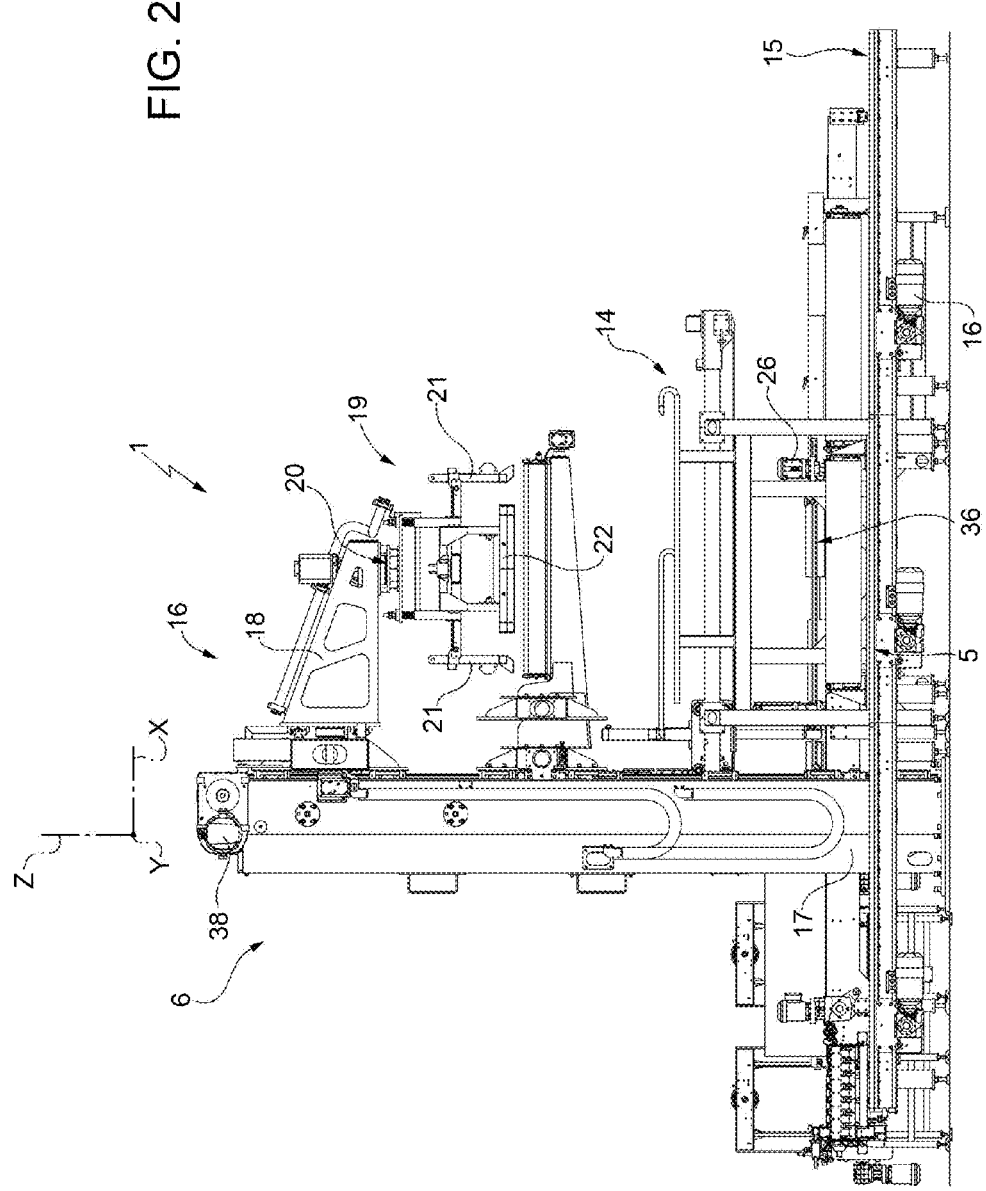
FIG. 2 is a side view of a depalletization device From FIG. 1, with its parts exploded for the sake of clarity.

The device 6 comprises, in turn (FIG. 2):
A column 17 that extends parallel to the axis Z, is orthogonal to the axes X, Y, and is vertical in the case in question here;
An arm 18 that extends parallel to the axis Y and can move parallel to the axes Z, Y with respect to the column 17;
An extraction/unloading head 19 that is fixed relative to the arm 18; and
A pair of motors 37, 38 that are controlled by the control device 12 and are connected operationally connected to the arm 18 in order to cause said arm to move parallel to the axes Z, Y relative to the column 17.

In particular, the column 17 is arranged on one side of the conveyor 7 and of the exit station 36.

The arm 18 is able to move parallel to the axis Z between a lowered position, in which it is at a first level that is slightly above the conveyors 5, 7, and a raised position (FIGS. 1 and 2) in which the arm 18 is located at a second level above the first level relative to the conveyors 5, 7.

The device 6 switches cyclically between:
A configuration for extracting the upper layer 3 from the pallet 2 by the conveyor 5, in which configuration the arm 18 is located in the lowered position and corresponds to the station 36 parallel to the axis Y; and
A configuration for unloading the layer 3 onto the conveyor 10, in which configuration the arm 18 is located in the lowered position and corresponds to the conveyor 7 parallel to the axis Y.

During the switch from the extraction configuration to the unloading configuration, the arm 18 moves from the lowered position to the raised position parallel to the axis Z, travels while remaining in the raised position parallel to the direction Y towards the conveyor 10, and moves toward the lowered position parallel to the axis Z.

During the switch from the unloading configuration to the extraction configuration, the arm 18 moves from the lowered position to the raised position parallel to the axis Z, travels in the raised position parallel to the axis Y toward the conveyor 5, and moves toward the lowered position parallel to the axis Z.

The head 19 comprises, in turn (FIG. 3):
A structure 20 that is attached to the arm 18;
A pair of gripping elements 21, which are fixed relative to the structure 20 and lie on the respective planes that are orthogonal to the axis Y; and
A pair of gripping elements 22 that are hinged to the structure 20 around the respective axes parallel to the axis X and are located between the elements 21 1 parallel to the axis Y.

The elements 22 can be moved between:
A gripping position (FIGS. 1, 2, and 3), in which position their respective planes are extended orthogonal to the axis Y and make contact with the upper layer 3 of the pallet 2; and
A position of rest (not shown), in which its respective planes are extended parallel to the axis Z.

In particular, when the device 6 is in the extraction configuration and when it is shifted from the extraction configuration to the unloading configuration, the elements 22 are in the gripping position in order to be able to work with the walls 21 in gripping the layer 3.

By contrast, when the device 6 is in the unloading configuration and when it is moved from the unloading configuration to the extraction configuration, the elements 22 are in the position of rest in order to make it possible to unload the layer 3 onto the conveyor 10 and to put the head 19 into the proper position with respect to the layer 3 in order to carry out extraction corresponding to the extraction station 36 of the conveyor 5.

The conveyor 7 comprises a transfer surface 23, which is horizontal in the case illustrated here, and a motor 24 that is driven in order to determine the forward motion of the surface 23 parallel to the axis Y.

In the case illustrated here, the surface 23 is a continuous carpet.

The control device 12 is also programmed to control the motor 21 cyclically in such a way as to:
Halt the surface 23 when the device 6 is unloading the layer 3; and
Cause the surface 23 to move forward parallel to the axis Y after the device 6 has unloaded the entire layer 3 onto the surface 23.

Advantageously, the device 1 comprises, in turn (FIG. 3):
A conveyor 10, that is supplied by the conveyor 7 with the complete layers 3, one after the other;
A pair of conveyors 11a, 11b, one or the other of which alternatingly receives the complete layers 3 one after the other; and
An actuator 14 that can be controlled to transfer the entire layer 3 that is present on the conveyor 10 onto one or the other of the conveyors 11a, 11b.

In other words, the actuator 14 transfers each entire layer 3 onto either the conveyor 11a or the conveyor 11b.

The conveyor 10 comprises in turn a transfer surface 25, which is horizontal in the case illustrated here, and a motor 26 that is driven to determine the forward motion of the surface 25 parallel to the axis Y.

In the case illustrated here, the surface 25 consists of a carpet.

The control device 12 is programmed to control the motor 26 in such a way as to:
Determine the forward progress of the surface 25 parallel to the axis Y and of the opposite part of the conveyor 7 during the phase when the layer 3 itself is being transferred from the conveyor 7; and
Halt the surface 25 once the transfer of the layer 3 from the conveyor 7 has been completed.

The control device 12 is also programmed to control the actuator 14 in such a way that the actuator 14 itself:
Remains in a fixed position and separated from the layer 3 during the phase when the conveyor 10 moves forward parallel to the axis Y; and
Transfers the layer 3 parallel to the axis X alternatingly onto conveyor 11a or conveyor 11b once the conveyor 10 is closed with respect to the axis Y and the layer 3 has been positioned on the conveyor 10 itself.

The actuator 14 comprises (FIG. 4) a bar 27 that is located above the conveyor 10 parallel to the axis Z and extended in length parallel to the axis Y.

The bar 27 can be moved parallel to the axis X alternatingly:
Into a first line (straight line pointing upward in FIG. 3) that points from the conveyor 10 toward the conveyor 11a in such a way as to transfer the entire layer 3 onto conveyor 11a itself; or
Into a second line (straight line pointing downward in FIG. 3) which points in the opposite direction from the first line and is directed from the conveyor 10 toward the conveyor 11b in such a way as to transfer the entire layer 3 onto conveyor 11b itself.

Figure 4:
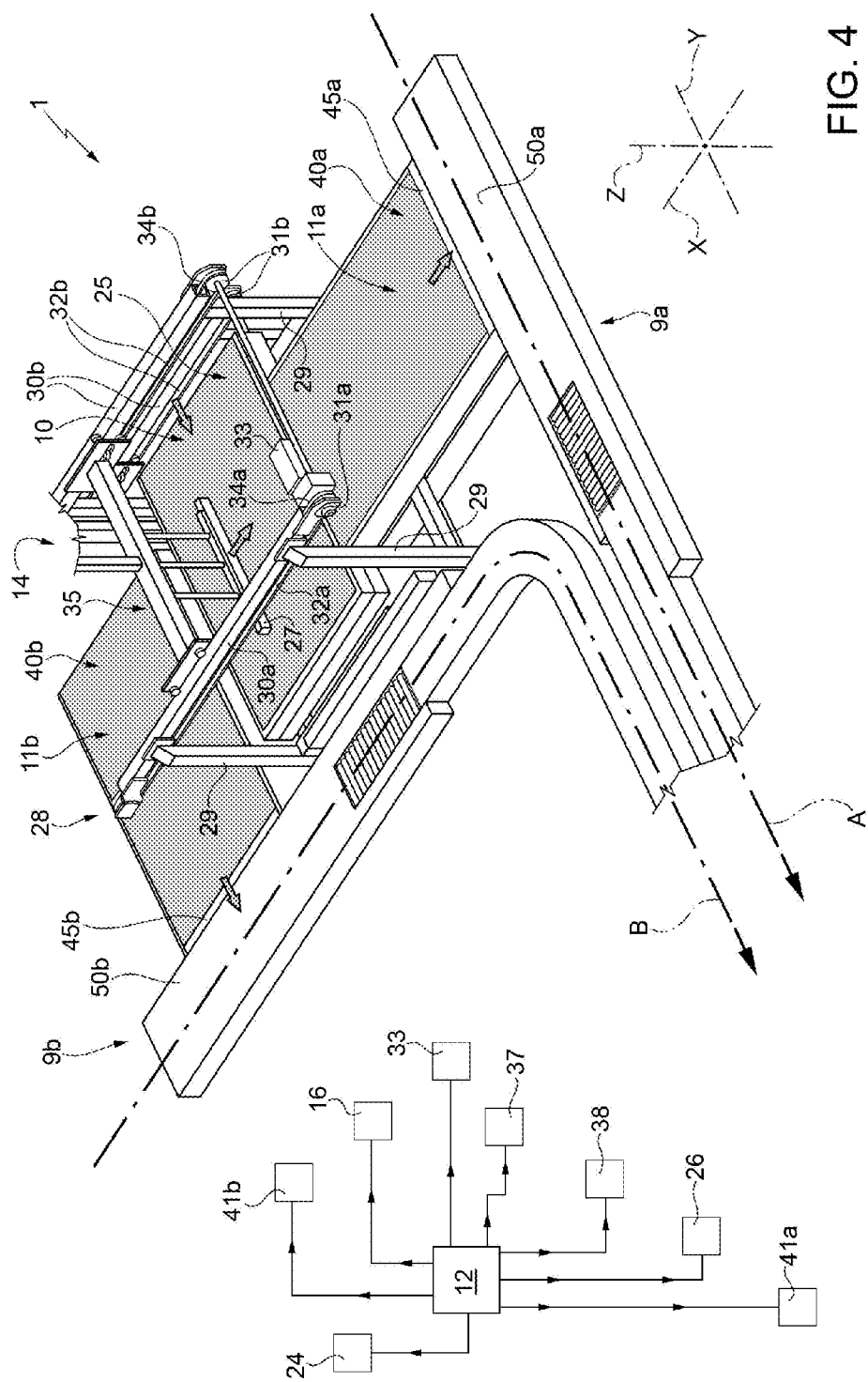
FIG. 4 is a greatly magnified perspective view of the depalletization device of FIGS. 1-3, with the parts exploded for the sake of clarity.

More specifically, the actuator 14 comprises (FIG. 4):
A frame 28 that is made up of a number of columns 29 that are parallel to the axis Z and a pair of crosspieces 30a, 30b, which extend a certain distance from the surface 25 parallel to the axis Z, are extended in length parallel to the axis X, and are separated from one another parallel to the axis Y;
Two pairs of pulleys 31a (only one of which is shown in FIG. 4) that are supported by the crosspiece 30a and two pairs of pulleys 31b (only one of which is seen in FIG. 4) that are supported by the crosspiece 30b;
a pair of belts 32a, 32b that are wrapped around the pulleys 31a, 31b and have respective main branches 34a, 34b that are parallel to the axis X; and
A motor 33 that is operationally connected to one of the pulleys 31a, 31b and can be driven by the control device 12 to control the rotation of the pulleys 31a, 31b and the translational motion of the main branches 34a, 34b of the belts 32a, 32b parallel to the axis X.

The motor 33 is controlled by the control device 12 in such a way as to control selectively the rotation of the pulleys 31a, 31b in a first line and in a second line in order to direct the translational motion of the bar 27 in the first line or in the second line parallel to the axis X.

The actuator 14 also comprises a crosspiece 35 that extends parallel to the axis Y and is supported by the belts 32a, 32b and by the cantilevered projections below the bar 27.

In particular, the pulleys 31a, 31b are mounted on the crosspieces 30a, 30b in such a way as to be able to rotate around the respective axes, which are parallel to the axis Y.

The conveyors 11a, 11b are located on either side of the conveyor 10 parallel to the axis X.

The conveyors 11a, 11b alternatingly transfer the entire layers 3 one after the other onto the conveyor 9a or onto conveyor 9b.

Each conveyor 11a, 11b comprises, in turn:
A respective transfer surface 40a, 40b, which is horizontal in the case illustrated here and can move toward the respective conveyor 9a, 9b to transfer the entire layer 3 from the conveyor 10 onto the respective conveyors 9a, 9b; and
A motor 41a, 41b that is controlled by the control device 12 and can be driven to control the forward motion of the respective surface 40a, 40b parallel to the axes X, Y.

In particular, the conveyor 11a transfers the entire layer 3 parallel to the axis X onto the conveyor 9a.

Alternatively, the conveyor 11b transfers the entire layer 3 parallel to the axis Y onto the conveyor 9b.

The conveyor 11a comprises the following in the area where it interfaces with the conveyor 9a:
A pair of rollers 45a (depicted only in schematic form here) that are driven independently of the surface 40a and are arranged between the conveyor 9a and the conveyor 11a; and One or more motors (not shown) that drive the rollers 45*a* in rotation in such a way that the latter have a tangential velocity than that of the surface 40*a* and in alignment with the surface 40*a* itself.

Owing to the fact that they have a tangential velocity that is greater than that of the surface 40*a*, the rollers 45*a* separate, one after the other, the rows 13*a* of the layer 3 that are arranged parallel to the axis Y from the rest of the layer 3 itself and, one after the other, transfer the rows 13*a* onto the conveyor 9*a*.

The rollers 45*a* can rotate around the respective axes, which are parallel to the axis Y.

Similarly, the conveyor 11*b* comprises, in the area where it interfaces with the conveyor 9*b*:

A pair of rollers 45*b* (depicted only in schematic form) that are driven independently of the surface 40*b* and are located between the conveyor 9*b* and the conveyor 11*b*; and One or more motors (not shown) that drive the rollers 45*b* in rotation in such a way that the latter have a tangential velocity that is greater than that of the surface 40*b* and are aligned with the surface 40*b* itself.

The rollers 45*b* can rotate around the respective axes, which are parallel to the axis X.

Owing to the fact that they have a tangential velocity that is greater than that of the surface 40*b*, the rollers 45*b* separate, one after the other, the columns 13*b* of the layer 3 that are arranged parallel to the axis X from the rest of the layer 3 itself and transfer, one after the other, the columns 13*b* onto the conveyor 9*b*.

Moving from the respective conveyors 11*a*, 11*b* toward the respective exit stations 8*a*, 8*b* (FIG. 4), the conveyor 9*a*, 9*b* comprises:

An entry section 50*a*, 50*b* that is located on the opposite part of the exit station 8*a*, 8*b* of the device 1 and is supplied by the respective conveyor 11*a*, 11*b* with the rows 13*a* or the columns 13*b* of the layer 3;

An initial segment 51*a*, 51*b* that is extended in length parallel to the axes Y, X and that is wider measured orthogonally to the axes Y, X and along which the individual boxes 4 are transferred parallel to the axes Y, X;

An intermediate segment 52*a*, 52*b* that is of decreasing width; and

A terminal segment 53*a*, 53*b* that is narrower than the initial segment 51*a*, 51*b* terminating in the respective exit station 8*a*, 8*b*.

Each conveyor 9*a*, 9*b* extends along a respective direction A, B that is transverse to, respectively, axes X, Y.

Preferably, the conveyor 9*a*, 9*b* defines a surface for conveying the boxes 4, which surface is made up of a number of chains 54*a*, 54*b* that are parallel to each other and are driven independently of one another.

Thus, the chains 54*a*, 54*b* are able to move forward at different speeds parallel to the directions A, B, in such a way as to cause the boxes 4 to rotate around the axis Z and to vary the orientation of the boxes 4 with respect to the axis Z itself.

More particularly, the speeds of the chains 54*a*, 54*b* are controlled in such a way as to arrange the shorter sides 60 of the boxes 4 orthogonal to the respective directions of forward motion A, B of the boxes 4 themselves and the longer sides 60 parallel to the directions of forward motion A, B of the boxes 4 themselves.

Each exit station 8*a*, 8*b* comprises a respective conveyor 62*a*, 62*b* which define a support surface 63 for the boxes 4 by means of a carpet, which receives the boxes 4 arranged with the respective short sides 60 orthogonal to the direction of forward motion.

Software is loaded and executed on the control device 12 and implements an algorithm that controls the motors 16, 24, 26, 33, 38, 41*a*, and 41*b*.

In operation, the pallet 2, which is composed of the layers 3 that are stacked parallel to the axis Z of boxes 4, is located on the surface of the conveyor 5.

The control device 12 controls the motor 16 of the conveyor 5 in such a way as to cause the surface 15 and the pallet 2 to move forward parallel to the axis X and to halt the surface 15 and the pallet 2 corresponding to station 36.

The device 6 extracts from the station 36 the layer 3 that is located in the upper position parallel to the axis Z—i.e., opposite surface 15—and deposits it on the conveyor 7.

More specifically, the control device 12 controls the motors 37, 38 in such a way as to arrange the device 6 in the extraction configuration when the surface 15 is halted and to switch the device 6 from the extraction configuration to the unloading configuration.

In particular, when the arm 18 is in the lowered position above the station 36, the elements 22 switch from the position of rest to the gripping position. Thus, the elements 22, 21 grip the upper layer 3 of the pallet 2.

Then, the arm 18 is moved, parallel to the axis Z, Into the lowered position into the raised position switches into the raised position toward the conveyor 10 and parallel to the axis Y, and is moved parallel to the axis Z from the raised position to the lowered position.

At this point, the elements 22 switch into the position of rest in order to deposit the entire upper layer 3 onto the surface 23 of the conveyor.

The control device 12 controls the motor 24 of the conveyor 7 in such a way that the surface 23 is halted when the device 6 unloads the layer 3 onto it and causes the surface 23 to move parallel to the axis Y and toward the conveyor 10 once the layer 3 has been deposited thereupon.

The forward motion of the surface 23 parallel to the axis Y and toward the conveyor 10 determines the transfer of the layer 3 from the conveyor 7 to the conveyor 10.

More specifically, the control device 12 controls the motor 26 of the conveyor 10 in such a way as to:

Keep the surface 25 halted while the conveyor 7 transfers the entire layer onto the conveyor 10.

Move the surface 25 forward parallel to the axis Y and from the opposite side of the conveyor 10 once the transfer of the layer 3 onto the conveyor 10 has been completed; and Again halt the surface 25 once the entire layer 3 is in a position that interferes with the rod 27 in a direction parallel to the axis X.

Once the surface 25 has been halted, the actuator 14 pushes the entire layer 3 onto the conveyor 11*a* or onto the conveyor 11*b*.

Hereinafter, the operation of the device 1 will be described by way of example with reference to an operating mode in which the actuator 14 transfers into the first line the entire layer 3 from the halted conveyor 10 onto the conveyor 11*a* and the latter then transfers the entire layer 3 onto the conveyor 9*a*.

The operation of the device 1 is very similar in the case where the actuator 14 transfers into the second line the entire layer 3 from the halted conveyor 10 onto the conveyor 11*b* and the latter then transfers the entire layer 3 onto the conveyor 9*b*.

More specifically, once the surface 25 has been halted, the control device 12 controls the motor 33 in such a way as to rotate with a tangential velocity and thus to cause the main branches 34a, 34b and the bar 27 to translate in the first line and parallel to the axis X.

Because of this translational motion, the bar 27 comes into contact with the entire layer 3 that is located on the conveyor 10 and transfers it on to the conveyor 11a.

The control device 12 controls the motor 41a in such a way as to keep the surface 40a of the conveyor 11a halted parallel to the axis X during the phase when the entire layer 3 is being transferred from the conveyor 10 to the conveyor 11a.

The control device 12 then controls the motor 41a in such a way as to move the surface 40a and thus to transfer the entire layer 3 parallel to the axis X in the first line and toward the conveyor 9a.

The rollers 45a rotate at a tangential velocity that is greater than the velocity of the surface 40a.

In this way, the rollers 45a separate the rows 13a one after the other and transfer them to the entry section 50a of the conveyor 9a.

The boxes 4 pass through the segments 51a, 52a, and 53b of the conveyor 9a.

The chains 54a of the conveyor 9a support the boxes 4 of the rows 13a and each have a respective speed of forward motion that is independent of those of the others.

In this way, the chains 54a cause the boxes 4 to rotate around the axis Z and put them into a desired arrangement, for example, with the short sides 60 orthogonal to the direction A, B of the conveyor 9a, 9b.

Once the device 6 has finished unloading the entire layer 3 on the conveyor 7, the device 6 switches from the unloading configuration to the extraction configuration in order to extract a new layer 3 from the pallet 2 and to repeat the cycle described above.

Once the device 6 has extracted all of the layers 3 and has deposited them on the conveyor 7, the pallet 2 has been completely taken apart.

An examination of the characteristics of the device 1 and of the method according to this invention makes clear the advantages that this approach makes possible.

In particular, the actuator 14 transfers the entire layer 3 from the conveyor 10 to the conveyor 11a and then to conveyor 9a or, alternatively, to conveyor 11b and then to conveyor 9b.

As a consequence, unlike the depalletization devices described in the preamble to this invention, the device 1 does not comprise a conveyor that is able to separate the entire pallet into a first group consisting of boxes to be conveyed to a first exit conveyor and a second group of boxes to be conveyed to a second exit conveyor.

Thus, it is possible to make the device 1 more compact and thereby reduce the costs and complexity involved in building and maintaining the device 1.

The conveyors 10, 11a, 11b and the actuator 14 of the device 1 are also not designed to separate the rows 13a or the columns 13b, but rather just to move the entire layer 3 off of the pallet 2, while the separation into rows 13a or columns 13b is accomplished by the rollers 45a, 45b that are placed between the conveyors 11a, 11b and the respective conveyors 9a, 9b.

Therefore, the device 1 is able to move layers 3 in any format, without creating any serious limitations due to the arrangement of the boxes 4 in the layer 3 and consequently with no serious limitations due to the format of the layer 3.

From this it follows that the device 1 turns out to be especially flexible with regard to the possibility of taking apart the pallet 2 with layers 3 arranged in variable formats compared to the known solutions as described in the preamble to this specification.

Finally, it is clear that modifications to and variants on the device 1 described and illustrated here can be made without exceeding the scope of protection defined by the claims.

The invention claimed is:

1. Depalletization device (1) that is able to disassemble a pallet (2) that is composed of at least a number of layers (3), comprising:
   A loading/unloading device (6) that is able to separate and extract said layer (3) from said pallet (2); and
   A first conveyor (7) that can be fed by said loading/unloading device (6) with said layer (3) separated from said pallet (2) and that is able to move said layer (3) forward;
   wherein the device further comprises:
   A second conveyor (10) that can be fed by said first conveyor (7) with the entire above-mentioned layer (3);
   A pair of third conveyors (11a, 11b) that is able to receive, one or the other alternatingly, the entire said layer (3); and
   Actuator means (14) that can be controlled to transfer the entire said layer (3) from said second conveyor (10) alternatingly onto one or the other of said third conveyors (11a, 11b).

2. Device according to claim 1, wherein the actuator means (14) are able to move parallel to a first axis (X) alternatingly or into a first line to move the entire said layer (3) and transfer said layer (3) onto one (11a) of said third conveyors (11a, 11b) or into a second line, which points in the opposite direction from the first line, to move the entire said layer (3) and transfer said layer (3) onto the other (11b) of said third conveyors (11a, 11b).

3. Device according to claim 2, wherein the actuator means (14) comprise at least one bar (27) that can move alternatingly parallel to said first axis (X) and be located away from a support surface (25) that is defined by said second conveyor (10).

4. Device according to claim 2, wherein the third conveyors (11a, 11b) are located in facing lateral strips on said second conveyor (10) relative to said first axis (X).

5. Device according to claim 2, further comprising at least two fourth conveyors (9a, 9b) that are configured to move forward at least one box (4) that is part of a row (13a) or a column (13b) of said layer (3) according to the respective directions of forward motion (A, B);
   Each said fourth conveyor (9a, 9b) can, in operation, be fed with said row (13a) or said column (13b) of said boxes (4) by the respective third conveyor (11a, 11b);
   Each said third conveyor (11a, 11b) can move transversely with respect to said corresponding direction of forward motion (A, B) of the respective third conveyors (11a, 11b) in such a way as to transfer alternatingly the above-mentioned entire layer (3), said row (13a), or said column (13b) one after the other or onto one or the other of said fourth conveyors (9a, 9b);
   Said control device (12) is programmed to:
   Keep at least one of said third conveyors (11a, 11b) halted and at the same time move said actuator means (14) parallel to said first axis (X) in such a way as to transfer the entire above-mentioned layer (3) onto said at least one of said third conveyors (11a, 11b);

Move at least one of said third conveyors (11a, 11b) and at the same time halt said actuator means (14) in such a way as to transfer the entire above-mentioned mentioned layer (3) toward one of the above-mentioned fourth conveyors (9a, 9b) once the entire above-mentioned mentioned layer (3) has been transferred onto at least one of the above-mentioned third conveyors (11a, 11b).

6. Device according to claim 2, wherein the second conveyor (10) can move parallel to a second axis (Y) that is transverse to said first axis (X).

7. Device according to claim 6, wherein the actuator means (14) comprise at least one bar (27) that can move alternatingly parallel to said first axis (X) and be located away from a support surface (25) that is defined by said second conveyor (10).

8. Device according to claim 6, further comprising a control device (12) that is programmed to:
move said second conveyor (10) parallel to said second axis (Y) in such a way as to transfer the entire above-mentioned layer (3) onto the above-mentioned second conveyor (10) and to place said layer (3) in the desired position on said conveyor (10) and at the same time to keep the above-mentioned actuator means (14) halted parallel to said first axis (X) in a position in which said actuator means (14) are, when in use, separated from said layer (3); and
Halt said second conveyor (10) and at the same time move said actuator means (14) parallel to said second axis (Y) once the transfer and positioning of the entire above-mentioned layer (3) on said second conveyor (10) have been completed in such a way as to transfer the entire above-mentioned layer onto one (11a) or the other (11b) of said third conveyors (11a, 11b) alternatingly.

9. Device according to claim 8, wherein the actuator means (14) comprise at least one bar (27) that can move alternatingly parallel to said first axis (X) and be located away from a support surface (25) that is defined by said second conveyor (10).

10. Device according to claim 1, wherein the actuator means (14) comprise at least one bar (27) that can move alternatingly parallel to said first axis (X) and be located away from a support surface (25) that is defined by said second conveyor (10).

11. Device according to claim 10, wherein the actuator means (14) comprise, in turn:
At least one motor (33) that can be driven to generate a torque in said first line or said second line; and
At least one transmission element (31a, 31b; 32a, 32b) that comprises at least one section (34a, 34b) that extends parallel to said first axis (X) and can be driven by said motor (33) selectively and in either said first line or said second line parallel to said first axis (X);
Said bar (27) is operationally connected to said section (34a, 34b) of the first transmission element (31a, 31b; 32a, 32b).

12. Device according to claim 1, wherein the third conveyors (11a, 11b) are located in facing lateral strips on said second conveyor (10) relative to said first axis (X).

13. Device according to claim 1, further comprising at least two fourth conveyors (9a, 9b) that are configured to move forward at least one box (4) that is part of a row (13a) or a column (13b) of said layer (3) according to the respective directions of forward motion (A, B);
Each said fourth conveyor (9a, 9b) can, in operation, be fed with said row (13a) or said column (13b) of said boxes (4) by the respective third conveyor (11a, 11b);
Each said third conveyor (11a, 11b) can move transversely with respect to said corresponding direction of forward motion (A, B) of the respective third conveyors (11a, 11b) in such a way as to transfer alternatingly the above-mentioned entire layer (3), said row (13a), or said column (13b) one after the other or onto one or the other of said fourth conveyors (9a, 9b);
Said control device (12) is programmed to:
Keep at least one of said third conveyors (11a, 11b) halted and at the same time move said actuator means (14) parallel to said first axis (X) in such a way as to transfer the entire above-mentioned layer (3) onto said at least one of said third conveyors (11a, 11b);
Move at least one of said third conveyors (11a, 11b) and at the same time halt said actuator means (14) in such a way as to transfer the entire above-mentioned mentioned layer (3) toward one of the above-mentioned fourth conveyors (9a, 9b) once the entire above-mentioned mentioned layer (3) has been transferred onto at least one of the above-mentioned third conveyors (11a, 11b).

14. Device according to claim 13, further comprising separation means (45a, 45b) to separate at least said row (13a) or said column (13b) of boxes (4) from said layer (3);
Said separation means (45a, 45b) are inserted between each third conveyor (11a, 11b) and the respective fourth conveyor (9a, 9b);
Said separation means (45a, 45b) are able to move at a tangential velocity that is greater than that of any third conveyor (11a, 11b) in such a way as to separate the above-mentioned at least one row (13a) or said column (13b) of boxes (4) from the entire layer (3) and transfer it onto the respective fourth conveyor (9a, 9b).

15. Device according to claim 14, wherein the above-mentioned fourth conveyors (9a, 9b) comprise a number of support elements (54a, 54b) which, during operation, support said boxes (4) and move them forward;
Said support elements (54a, 54b) can move at different speeds parallel to said directions of forward motion (A, B) of the respective fourth conveyors (9a, 9b) in such a way as to vary the orientation of said boxes (4) with respect to a third axis (Z) that is transverse to said first axis (X) and to said second axis (Y).

16. Device according to claim 13, wherein the above-mentioned fourth conveyors (9a, 9b) comprise a number of support elements (54a, 54b) which, during operation, support said boxes (4) and move them forward;
Said support elements (54a, 54b) can move at different speeds parallel to said directions of forward motion (A, B) of the respective fourth conveyors (9a, 9b) in such a way as to vary the orientation of said boxes (4) with respect to a third axis (Z) that is transverse to said first axis (X) and to said second axis (Y).

17. Depalletization method for breaking down a pallet (2) that is made up of a number of layers (3), wherein it comprises phases of:
i) separating an above-mentioned layer (3) from said pallet (2);
ii) transferring said layer (3) onto a first conveyor (7); and
iii) moving said layer (3) located on said first conveyor (7) forward;
wherein the method further comprises the subsequent phases of:

iv) transferring said entire layer (3) from said first conveyor (7) onto a second conveyor (10); and
v) controlling actuator means (14) to transfer said entire layer (3) alternatingly onto one (11*a*) third conveyor (11*a*, 11*b*) or onto another (11*b*) third conveyor (11*a*, 11*b*).

\* \* \* \* \*